Feb. 7, 1950     B. D. WOOD     2,496,766
WHEELED ANIMAL WALKING TOY
Filed July 2, 1946     7 Sheets-Sheet 3
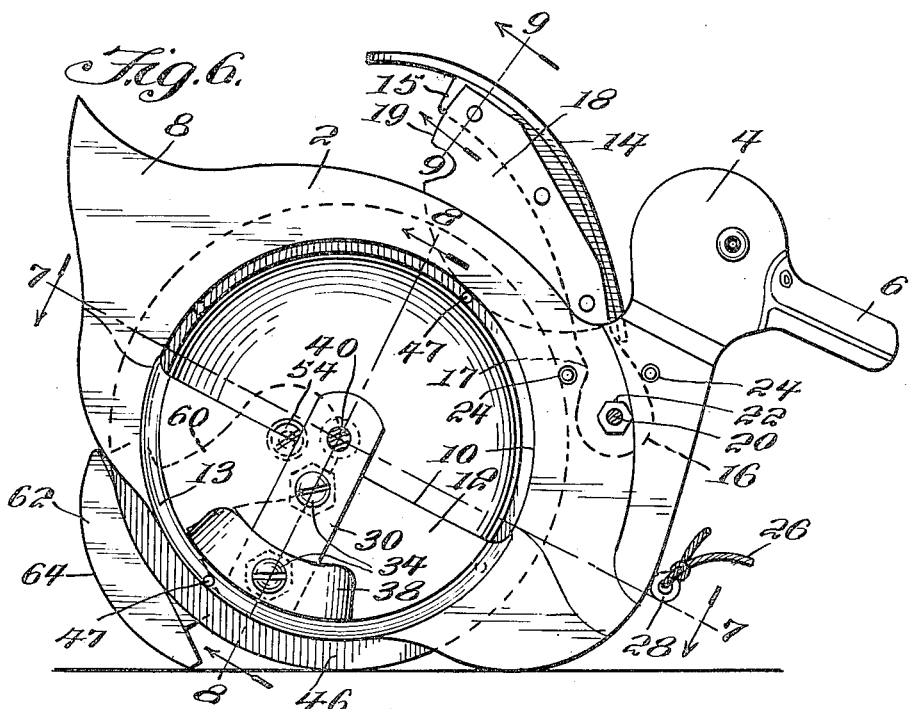
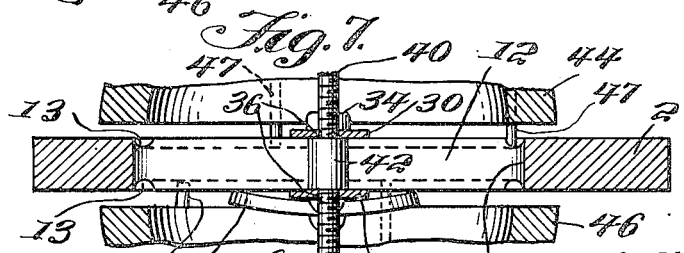
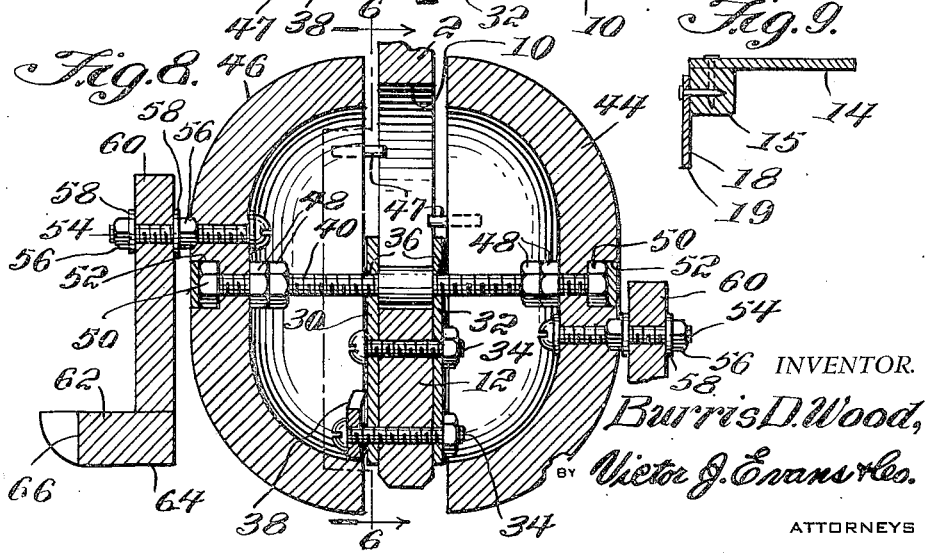
INVENTOR.
Burris D. Wood,
BY Victor J. Evans & Co.
ATTORNEYS Feb. 7, 1950      B. D. WOOD      2,496,766
WHEELED ANIMAL WALKING TOY
Filed July 2, 1946      7 Sheets-Sheet 4
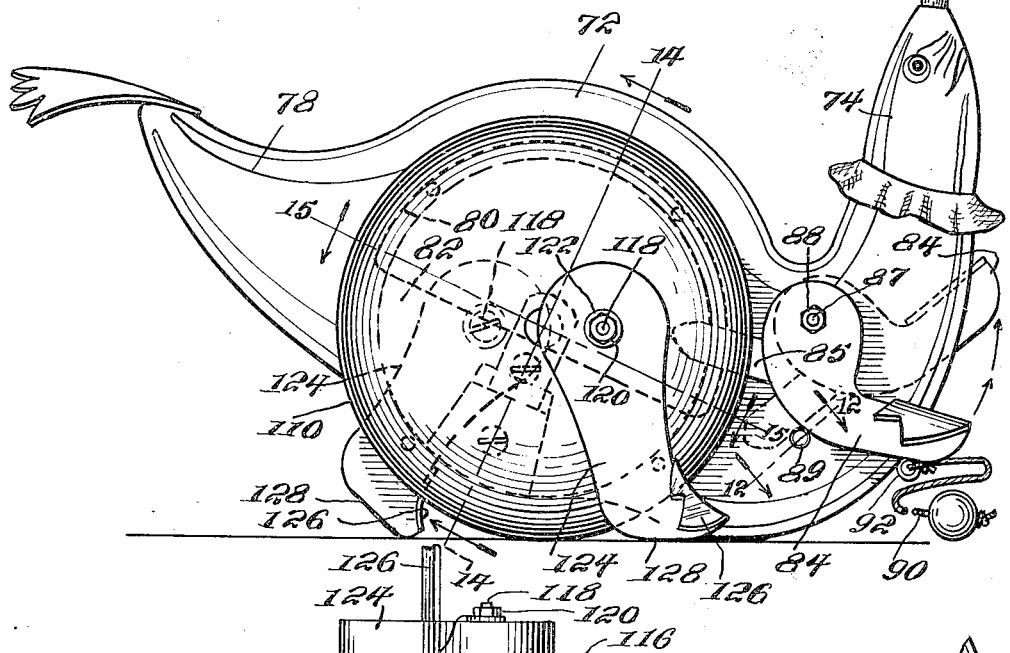
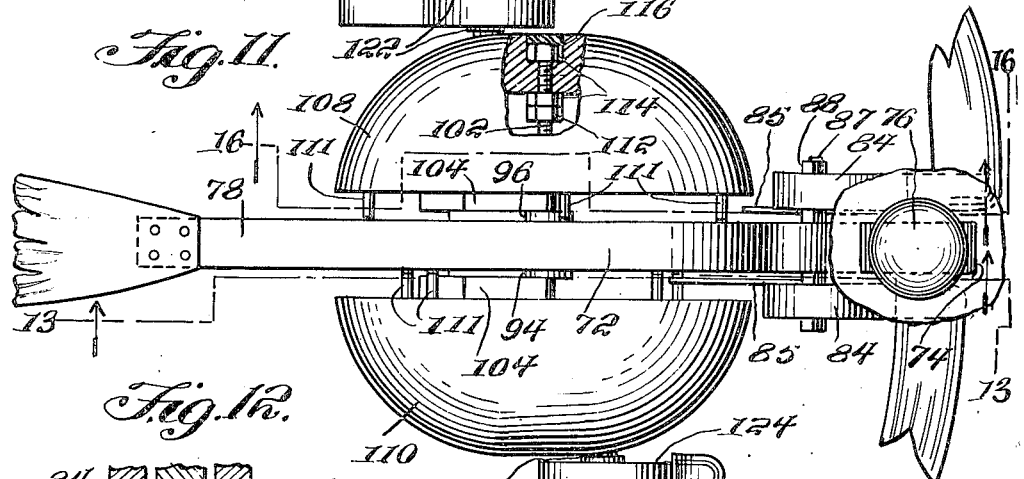
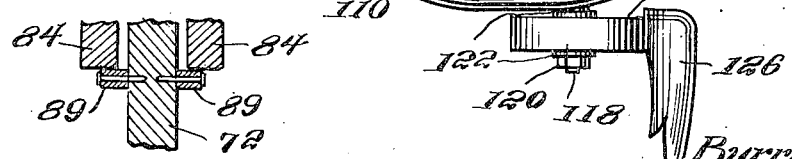
INVENTOR.
Burris D. Wood,
BY Victor J. Evans & Co.
ATTORNEYS Feb. 7, 1950 — B. D. WOOD — 2,496,766
WHEELED ANIMAL WALKING TOY
Filed July 2, 1946 — 7 Sheets-Sheet 5
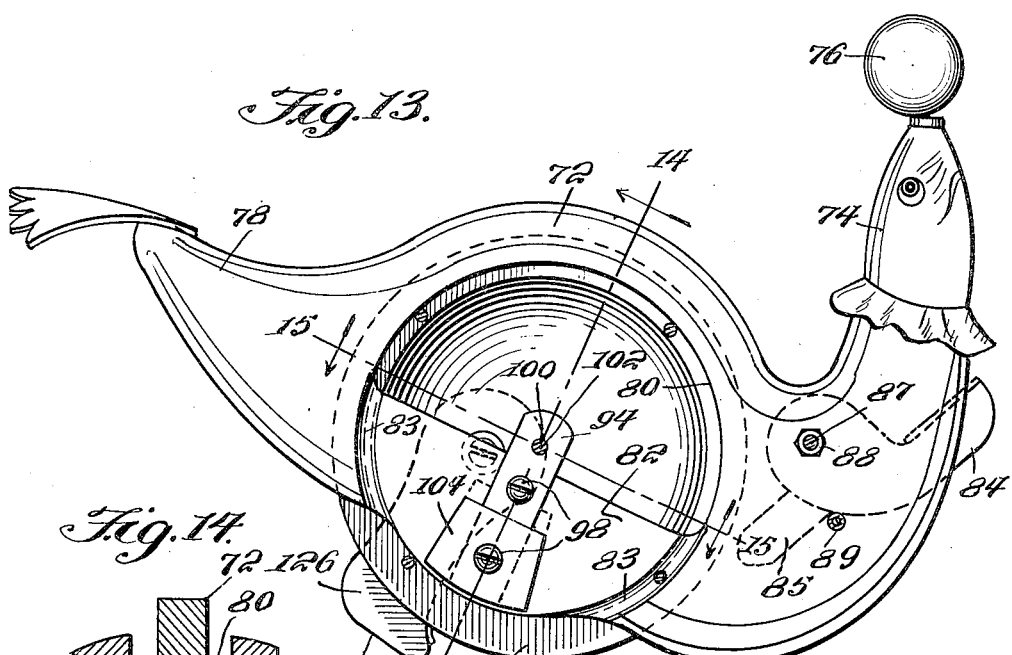
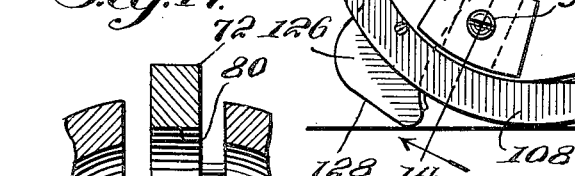
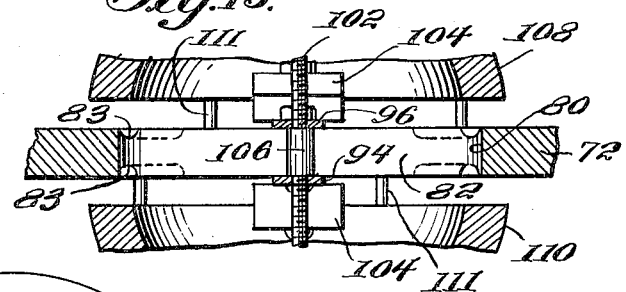
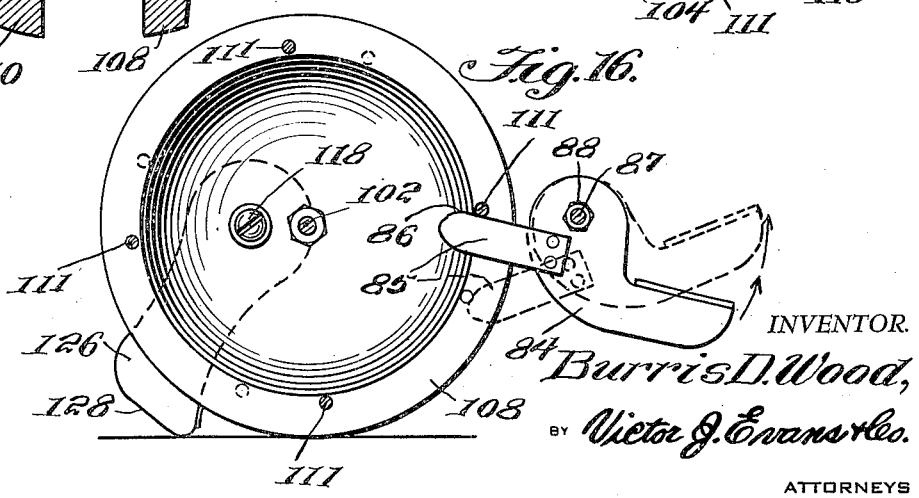
INVENTOR.
Burris D. Wood,
BY Victor J. Evans & Co.
ATTORNEYS

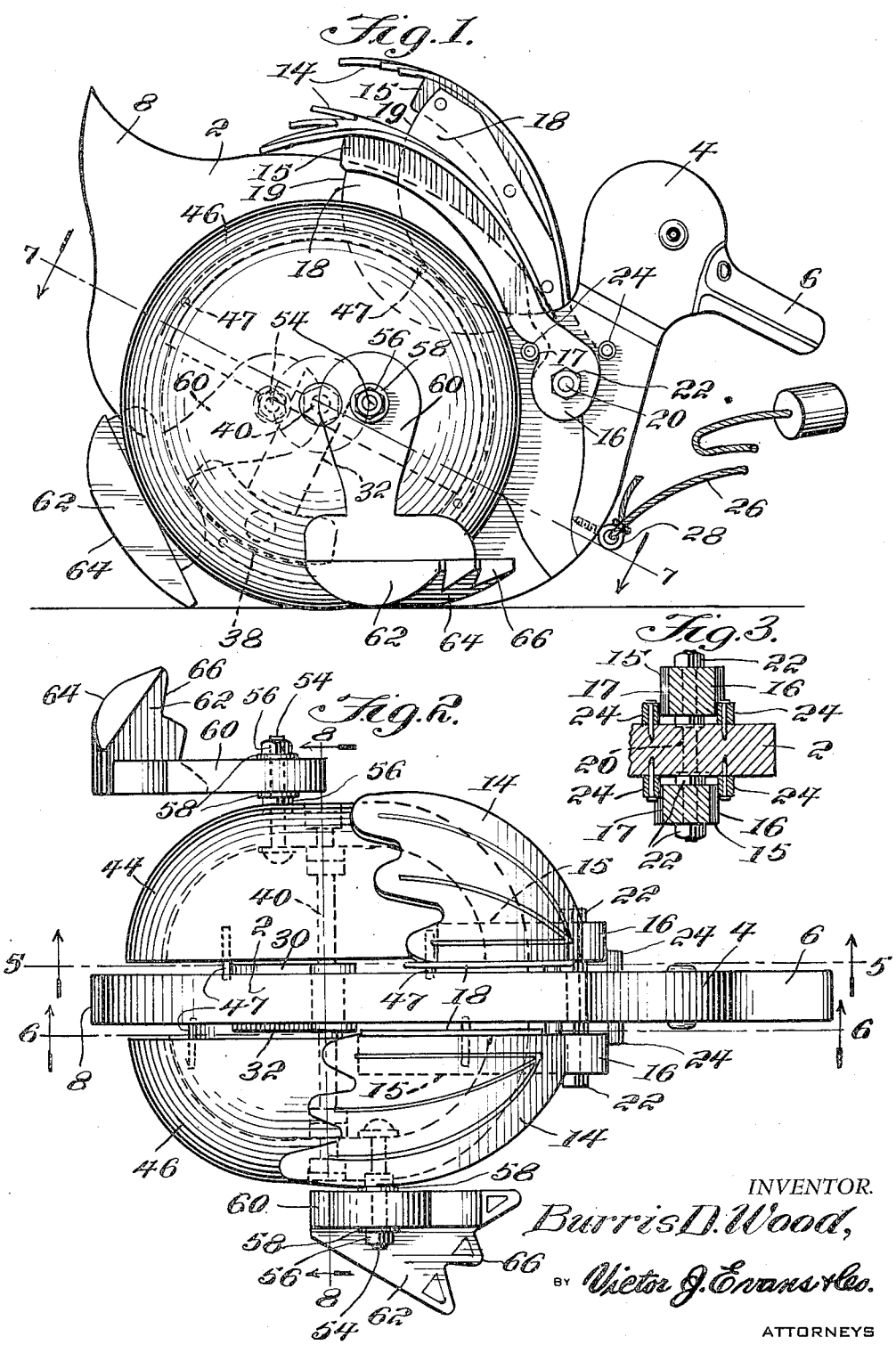

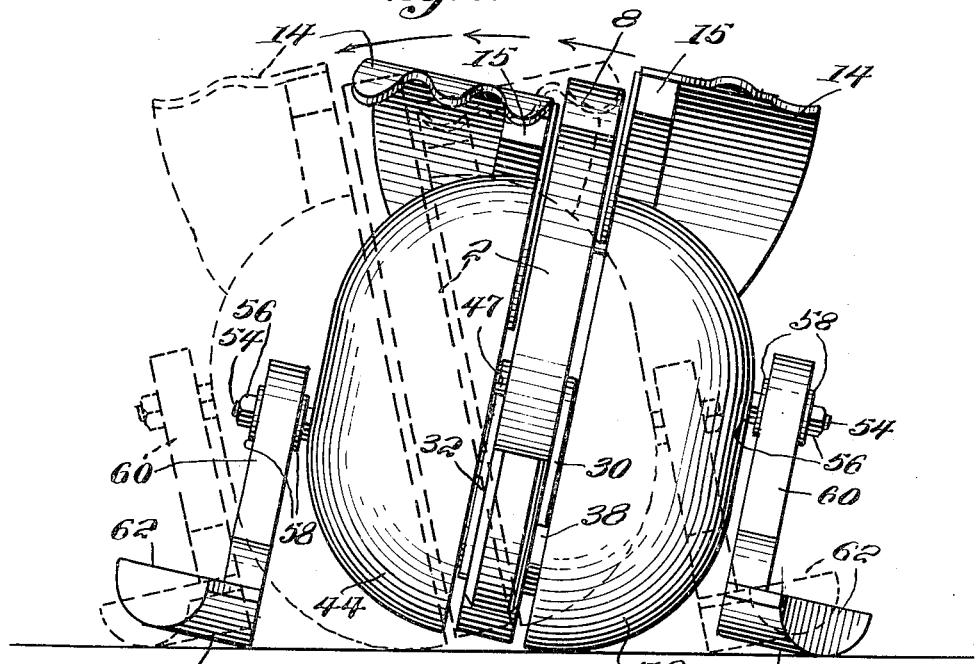
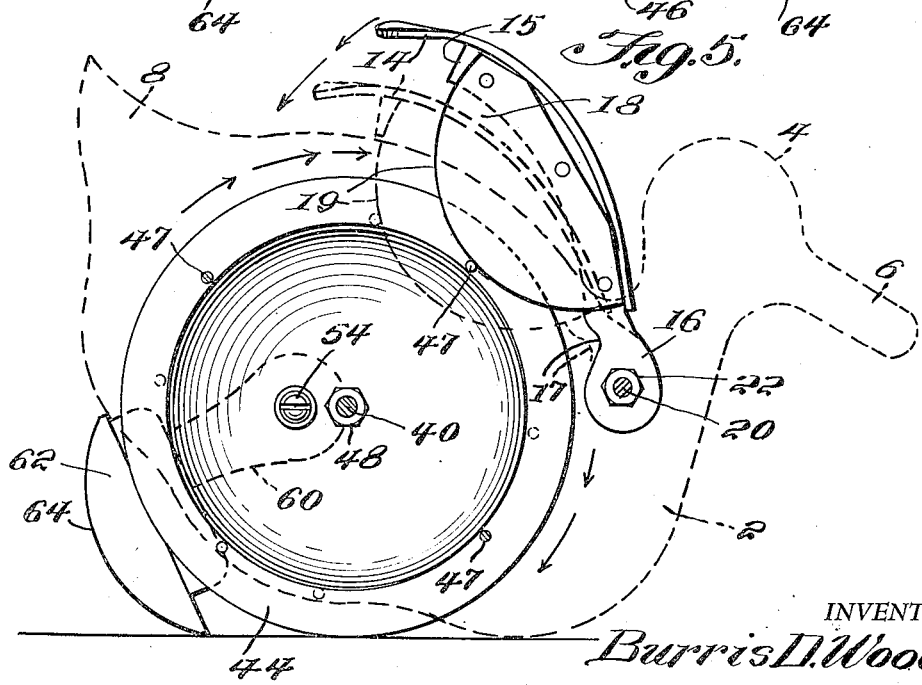

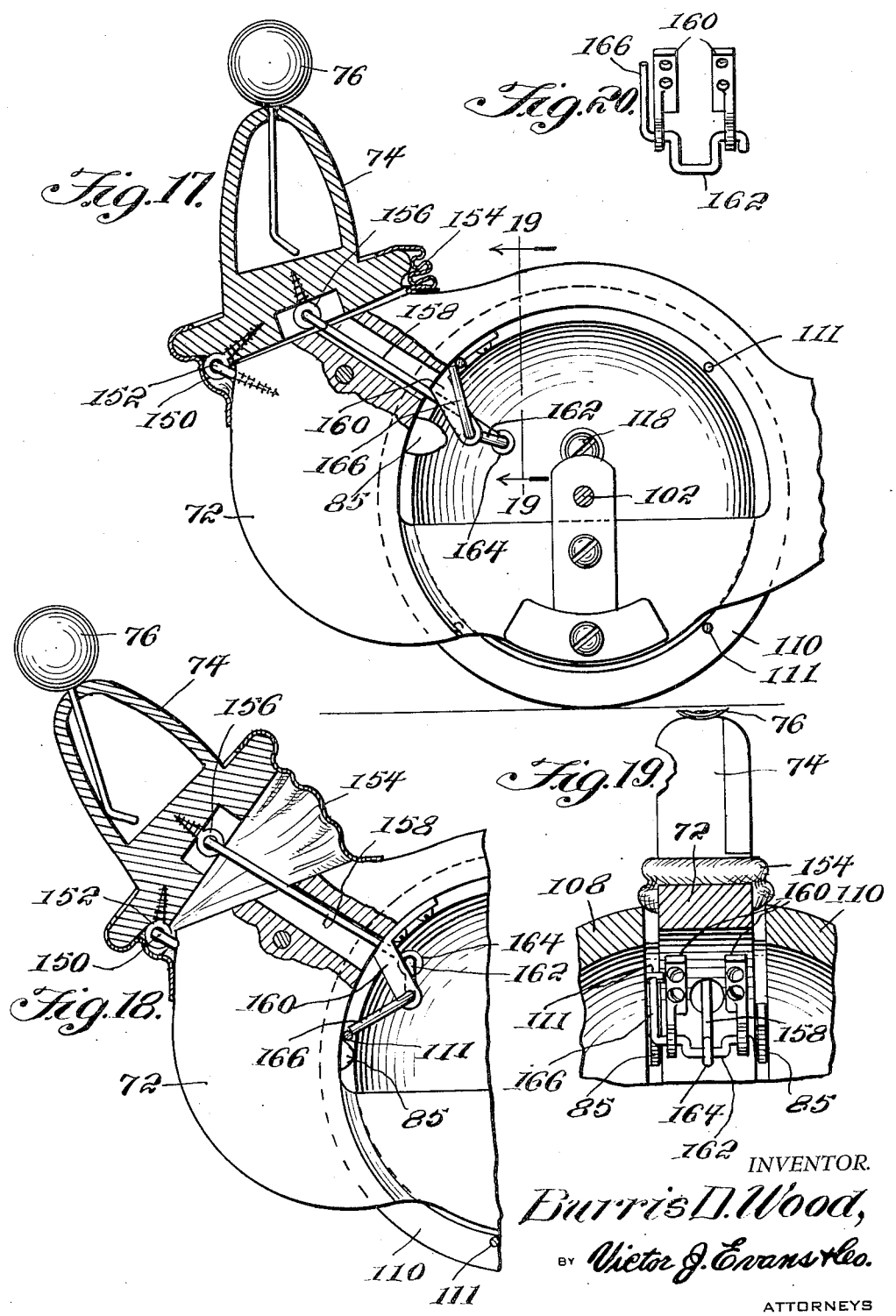

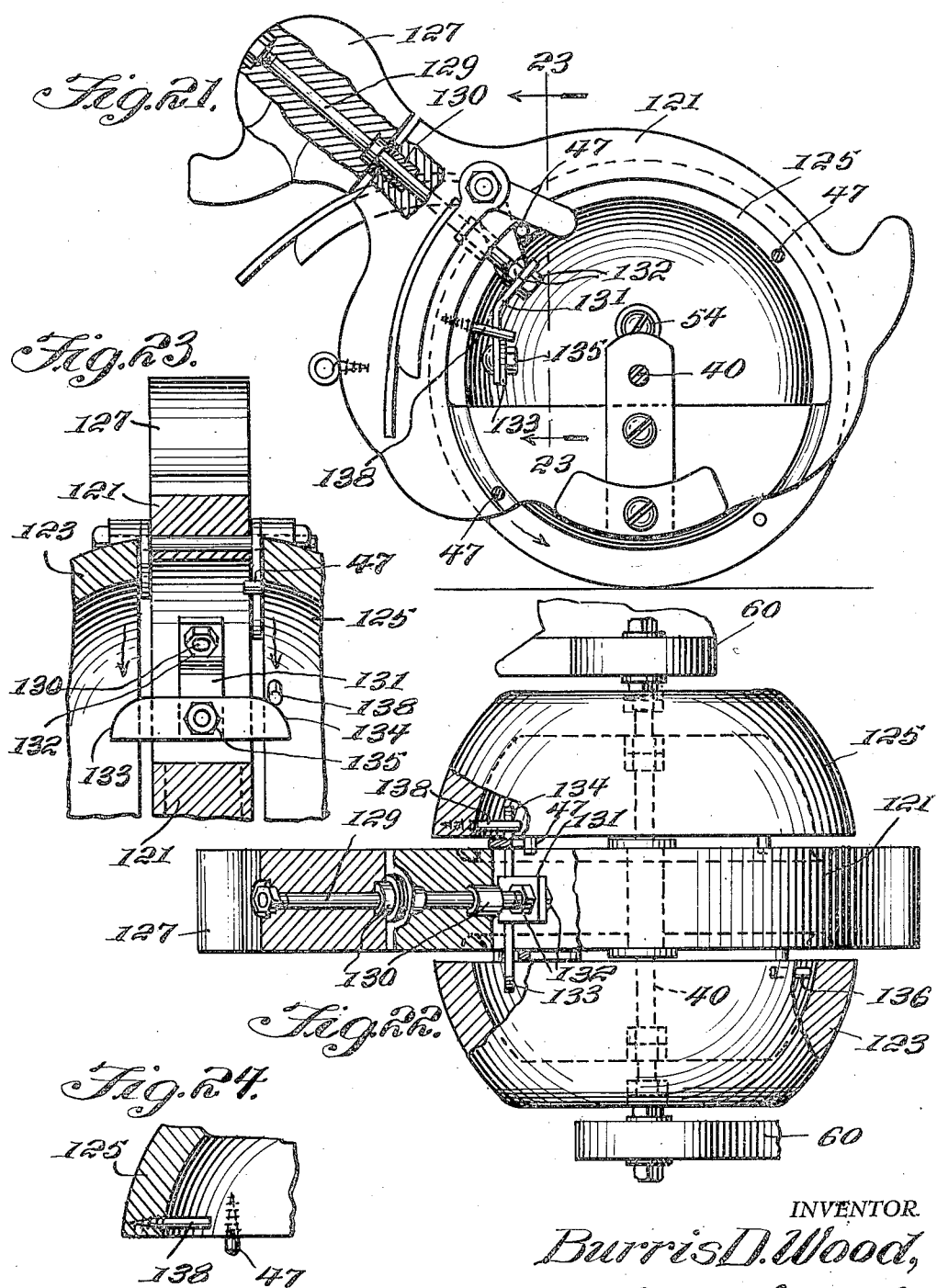

Patented Feb. 7, 1950

2,496,766

UNITED STATES PATENT OFFICE 2,496,766

WHEELED ANIMAL WALKING TOY

Burris D. Wood, Dallas, Tex.

Application July 2, 1946, Serial No. 681,007

8 Claims. (Cl. 46—105)

My present invention relates to an improved wheeled animal walking toy and more particularly to the type of toy adapted to be pulled or drawn by a child, upon the ground, and provided with wheel-type ground-engaging actuating elements to give the toy movement, and impart a life-like appearance when in motion.

Generally, the toy of my invention involves a pair of wheel elements mounted on opposite sides of a body, and the body which may take any of several different forms such as a duck, a seal, or other two-footed animal is fashioned in proper shape to simulate the animal and is provided with movable wings or flippers as the selection of genus may require.

The toy made according to my invention is simple in construction, is durable, and is so designed as to give hours of pleasure to the children.

The toy of my invention may with equal facility be drawn by a child upon a sidewalk, the ground, or indoors upon the floor or rugs.

In the drawings:

Figure 1 is a side elevational view of the toy of my invention embodying the form and shape of a duck.

Figure 2 is a top plan view thereof.

Figure 3 is a detail view of the wing operating structure.

Figure 4 is a rear elevational view of the toy.

Figure 5 is a vertical sectional view taken along line 5—5 of Figure 2.

Figure 6 is a vertical sectional view taken along line 6—6 of Figures 2 and 8.

Figure 7 is a horizontal sectional view along line 7—7 of Figure 6.

Figure 8 is a transverse sectional view taken along line 8—8 of Figure 6.

Figure 9 is a detail sectional view of the wing taken along line 9—9 of Figure 6.

Figure 10 is a side elevational view of the toy as applied to an animated seal.

Figure 11 is a top plan view thereof.

Figure 12 is a detail view of the tripping mechanism taken at line 12—12 of Figure 10.

Figure 13 is a vertical sectional view taken along line 13—13 of Figure 11.

Figure 14 is a transverse sectional view taken along line 14—14 of Figure 10.

Figure 15 is a horizontal sectional view taken along line 15—15 of Figure 10.

Figure 16 is a side elevational view of one of the wheel elements.

Figure 17 is a partial view in sectional of a modified seal.

Figure 18 is a detail view of the head moving mechanism associated with the modified structure of Figure 17.

Figure 19 is a detail view thereof.

Figure 20 is a detail view of the head tripping mechanism.

Figure 21 is a vertical sectional view of a modified form of the duck having a pivoted head.

Figure 22 is a horizontal sectional view of Figure 21.

Figure 23 is a vertical sectional view at line 23—23 of Figure 21.

Figure 24 is a detail view of the trip pins.

Referring now to the drawings, I employ a body 2 for the toy preferably made of wood or other material being flat in cross-section and shaped to show the silhouette of a duck and having a head 4 and a bill 6. The tail portion is shown at 8, and suitable ornamentation such as eyes, nostrils, and feathers may be added as by painting.

The body portion is fashioned with a central upper semi-circular opening 10, and a lower solid section 12. Concentric grooves 13 on the body provide clearance for the trip pins hereinafter referred to.

Mounted upon the body approximately at the lower end of the head portion 4 I utilize wings 14 of light material such as cloth or thin leather and having ribs 15 and journals 16 in the ends thereof. Transverse notches 17 are shown in the under sides of the ribs, and arcuate cams 18 having cam edges 19 are attached suitably to the ribs adapted to be actuated by the hereinafter referred to trip pins.

The wings are pivotally attached to the body by means of bolts 20 having nuts 22, and wing stops 24 as shown limit the movement of the wings.

A pull string 26 is attached to the body 2 by means of screw 28, and the pull string provides the motive power when the toy is in use.

Vertically upstanding on opposite sides of the solid section 12 of the body 2 are supporting bars 30 and 32 having bolts 34 for securing the bars to the section, and the bars are provided with openings 36 to receive the main axle 40. A spacer 42 between the bars and on the axle 40 provides proper alignment. The weight 38 is attached to the lower portions of the bars to give stability to the toy. This weight may be lead, or other heavy material and of suitable size to accomplish the desired purpose.

Adapted to be mounted upon the axle 40 and spaced from the body, are the two wheel sections comprising hemispherical wheels 44 and 46. Upon the inner flat edges of the hemispheres are mounted trip pins 47 which travel through the grooves 13 and trip the cams 18 of the wings by movement along the cam edges 19.

Lock nuts 48 retain the axle in non-rotatable relation with the wheels 44 and 46, i. e., the axle rotates within the openings 36 in the supporting bars 30 and 32, and the retaining nuts 50 countersunk at 52 retain the hemispheres in fixed relation with the axle, and rotate therewith.

In order to provide side to side movement or waddling in the case of a duck, I provide bolt axles 54 each off center with relation to the main axle and on opposite sides thereof. Adapted to rotate upon the bolt axles 54 I employ legs 60 secured in position on the bolt axles by nuts 56 and washers 58, and these legs depend freely from the axles, and the feet 62 have ground engaging portions 64 and ornamental webs as 66.

In operation when the toy is pulled along the ground by the child, the wheel portions, the hemispheres 44 and 46 revolve and the trip pins 47 on the inner flat peripheries thereof successively ride upon the cam edges 19 of the cams 18 to elevate and lower the wings. The pins are so spaced on the opposed inner flat edges that the wings alternate in raising and lowering.

The hemispheres 44 and 46 also in their rotation have a crank action upon the bolt axles 54 to alternately raise and lower the legs 60. Thus as seen in Figure 4 the toy will tilt or waddle from side to side with the right crank axle up, the hemisphere 46 touching the ground, and the left hemisphere 44 elevated off the ground by the lowered position of the crank or bolt axle 54 thereon.

Thus the toy when pulled will simulate the movement of a duck or similar fowl with the wings flapping, and the toy waddling from side to side.

In the modified form shown in Figures 10 through 16 I illustrate the toy as embodying the form of a seal having a body 72 with the head 74 and mounted upon the head 74 is a ball 76 appearing to be supported by the nose of the seal. The ball 76 may be mounted in any suitable manner. The tail of the seal is shown as at 78, and the body 72 of the seal is formed with a semi-circular opening 80 therein and a lower solid section 82. As in the case of the duck illustration arcuate grooves 83 are provided for the passage of the trip pins.

In the embodiment of the seal, I have fashioned flippers 84, L-shaped, and having rearwardly extending cam arms 85 with their cam edges 86. The flippers are attached to the body by means of bolts 87 and nuts 88, and pin stops 89 are provided for limiting the movement of the flippers when tripped.

A pull string 90 attached to the body by means of a screw 92 provides a convenient method of pulling the toy.

Within the toy and on opposite sides of the solid section 82 of the body, I employ supporting bars 94 and 96 having attaching bolts 98 and openings 100 therein. A main axle 102 is journaled in the openings, and a spacer 106 between the bars and on the axle provides proper alignment. Weights 104 on the lower portions of the bars render the toy stable and minimize the possibilities of the toy tipping over.

Hemispherical wheel sections 108 and 110 are mounted upon the axle to rotate therewith, and the sections are formed with trip pins 111 for passage through the arcuate grooves 83 to coact with the cam edges 86 to elevate the flippers.

The hemispherical wheel sections 108 and 110 are provided with lock nuts 112 and the retaining nuts 114 are countersunk in the exterior of the hemispheres as at 116.

Bolt axles 118 are mounted in the hemispheres off center and on opposite sides of the main axle, and nuts 120 and washers 122 provide attaching means for the depending rear flippers 124 of the seal. Feet-like members 126 engage the ground as at 128 and suitable ornamentation as desired may be provided.

The operation of the seal toy is similar to that as set forth for the duck, and further description of the operation for this modification is unnecessary.

Referring further now to the modification of the duck set forth in Figures 21 through 24 of the drawings I have shown the body 121 of the duck formed with hemispheres 123 and 125 and the head 127. The head is mounted on the body for rotation relative thereto by means of the rod 129 journaled in the bushing 130 in the body and having on its inner end a bracket 131 secured by nut 132. The bracket and rod rotate with relation to the body and they rotate the head. Movement is provided by the cam lugs 133 and 134 which are secured on the bracket 131 by nut 135. Pins 136 on the hemisphere 123 and pins 138 on hemisphere 125 alternately engage the opposite cam lugs as the hemispheres revolve, the pins tripping the cam lugs to rotate the rod and thus the head.

In the Figures 17 through 20 of the drawings I have illustrated a further modification of the seal toy wherein the head is movable with relation to the body, and the ball shown as balanced on the nose of the head will move to further simulate the movements of a seal.

The head 74 of this structure is mounted on the body 72 by means of hinge 150 formed of screw edges 152, and a flexible cover for the space between the head and body is provided at 154. A screw eye on the inner surface of the head as at 156 engages a rod 158 which rod extends through a hole in the body to the inner portion thereof. Brackets 160 secured on the body carry the crank 162 journaled therein, and the rod 158 is fashioned with a loop 164 on the crank. A lever 166 extending inwardly from the crank lies in the path of movement of the trip pins 111 on the hemispheres and as the pins move with the hemispheres the crank is pivoted in the brackets and effects a reciprocating movement to the rod which in turn moves the head on its hinge to and from the body. The ball 76 loosely supported on the head will move relative thereto and give the appearance that the seal is balancing the ball on its nose.

It should be clear from the above description of the toy of my invention that the toy will afford endless pleasure to children, and from its construction will be durable and inexpensive to manufacture.

Having thus fully described my invention, what I claim as new and desire to secure by Letters Patent is:

1. A toy comprising a body simulating an animal figure, hemi-spherical wheel sections rotatably mounted in the body, depending rear limbs eccentrically journaled in the wheel sections, fore limbs pivotally mounted in the body, and trip pins peripherally spaced on the wheel sections to periodically elevate the fore limbs and to release the fore limbs to permit lowering thereof by gravity and the rear limbs are longer than the shortest distance between the eccentric journal of the limbs and the periphery of the wheel sections so that oscillation of the toy is caused as it is moved forward.

2. A toy comprising a body simulating an animal figure, hemi-spherical wheel sections rotatably mounted in the body, depending rear limbs eccentrically journaled in the wheel sections, fore limbs pivotally mounted in the body, cams on the fore limbs and means on the wheel section intermittently actuating said cams to elevate and then permit lowering by gravity of the fore limbs and the rear limbs are longer than the shortest distance between the eccentric journal of the limbs and the periphery of the wheel sections so that oscillation of the toy is caused as it is moved forward.

3. A toy comprising a body simulating an animal figure, hemi-spherical wheel sections rotatably mounted in the body, depending rear limbs eccentrically journaled in the wheel sections, fore limbs pivotally mounted on the body, actuating cams on the fore limbs, and trip pins peripherally spaced on the wheel sections to intermittently elevate and permit the lowering by gravity of the said fore limbs and the rear limbs are longer than the shortest distance between the eccentric journal of the limbs and the periphery of the wheel sections so that oscillation of the toy is caused as it is moved forward.

4. A toy comprising a body simulating an animal figure, hemi-spherical wheel sections rotatably mounted in the body, depending rear limbs eccentrically journaled in the wheel sections, fore limbs eccentrically, pivotally mounted on the body, actuating cams on the eccentric fore limbs, and trip pins peripherally spaced on the wheel sections to intermittently elevate and permit the lowering by gravity of the said fore limbs and the rear limbs are longer than the shortest distance between the eccentric journal of the limbs and the periphery of the wheel sections so that oscillation of the toy is caused as it is moved forward.

5. A toy comprising a body simulating an animal figure, hemi-spherical wheel sections rotatably mounted in the body, depending rear limbs eccentrically journaled on the wheel sections and the limbs being longer than the shortest distance between the eccentric journaling of the limbs and the periphery of the wheel causes oscillation of the body as the toy is moved forward, fore limbs eccentrically, pivotally mounted on the body, actuating cams on the eccentric fore limbs, and trip pins peripherally spaced on the wheel sections to intermittently elevate and permit the lowering by gravity of the said fore limbs.

6. A toy comprising a body simulating an animal figure, hemi-spherical wheel sections rotatably mounted in the body, depending rear limbs eccentrically mounted on said wheel sections and journaled thereon, and the limbs being longer than the shortest distance between the eccentric journaling of the limbs and the periphery of the wheel oscillation of the body is caused as the toy is moved forward, fore limbs pivotally mounted on the body and actuated by the rotating hemi-spherical wheel sections, and a head pivotally mounted on the body and actuated by the rotating hemi-spherical wheel sections.

7. A toy comprising a body simulating an animal figure, hemi-spherical wheel sections rotatably mounted in the body, depending rear limbs eccentrically journaled in the wheel sections and the rear limbs being longer than the shortest distance between the eccentric journaling of the limbs and the periphery of the wheel oscillation of the body is caused as the toy is moved forward, fore limbs pivotally mounted on the body, actuating cams on the fore limbs, trip pins peripherally spaced on the wheel sections to intermittently elevate and permit the lowering by gravity of the said fore limbs, and a head pivotally mounted on the body having actuating means in the path of the said trip pins.

8. A toy comprising a body simulating an animal figure, hemi-spherical wheel sections rotatably mounted in the body, depending rear limbs eccentrically mounted on said wheel section and journaled thereon, and the rear limbs being longer than the shortest distance between the eccentric journaling of the limbs and the periphery of the wheel oscillation of the body is caused as the toy is moved forward fore limbs pivotally mounted on the body and actuated by the rotating hemi-spherical wheel sections, a head pivotally mounted on the body, a rod connected with the head for moving the same, and means in the path of the said pins and movable thereby for effecting movement of the rod.

BURRIS D. WOOD.

REFERENCES CITED

The following references are of record in the file of this patent:

UNITED STATES PATENTS

| Number | Name | Date |
|---|---|---|
| 228,231 | Erichsen | June 1, 1880 |
| 1,345,140 | Curry | June 29, 1920 |
| 1,509,020 | Mulligan | Sept. 16, 1924 |
| 1,701,910 | Davis | Feb. 12, 1929 |
| 2,013,709 | Boissoneau | Sept. 10, 1935 |
| 2,382,630 | Gumb | Aug. 14, 1945 |
| 2,406,283 | Fishel | Aug. 20, 1946 |